United States Patent
Hu et al.

(10) Patent No.: US 10,744,896 B2
(45) Date of Patent: *Aug. 18, 2020

(54) CHARGING RESCUE SYSTEM AND METHOD FOR ALL-ELECTRIC VEHICLES

(71) Applicant: HUNAN SCIENTOP AUTOMATIC EQUIPMENT SHARES CO., LTD, Changsha (CN)

(72) Inventors: Deng Hu, Changsha (CN); Xuekun Yu, Changsha (CN); Shen Wang, Changsha (CN)

( * ) Notice: Subject to any disclaimer, the term of this patent is extended or adjusted under 35 U.S.C. 154(b) by 151 days.

This patent is subject to a terminal disclaimer.

(21) Appl. No.: 15/997,693

(22) Filed: Jun. 5, 2018

(65) Prior Publication Data

US 2018/0281614 A1 Oct. 4, 2018

Related U.S. Application Data

(63) Continuation of application No. PCT/CN2015/099139, filed on Dec. 28, 2015.

(30) Foreign Application Priority Data

Dec. 7, 2015 (CN) .......................... 2015 1 0886976

(51) Int. Cl.
*B60L 53/57* (2019.01)
*B60L 53/10* (2019.01)
(Continued)

(52) U.S. Cl.
CPC ............. *B60L 58/10* (2019.02); *B60L 3/0046* (2013.01); *B60L 53/11* (2019.02); *B60L 53/14* (2019.02);
(Continued)

(58) Field of Classification Search
CPC ..................................... B60L 58/10; B60L 53/57; B60L 53/14; H02J 7/342; H02J 7/00; G06Q 30/06; G06Q 30/0601; G06Q 30/0635
(Continued)

(56) References Cited

U.S. PATENT DOCUMENTS

2014/0266047 A1* 9/2014 Robers ................ B60L 11/1848
320/109
2018/0281613 A1* 10/2018 Yu ........................ B60L 3/0023

FOREIGN PATENT DOCUMENTS

CN  103738190 A  4/2014
CN  104240076 A  12/2014
(Continued)

OTHER PUBLICATIONS

International Search Report of PCT/CN2015/099139 dated Jul. 26, 2016.

*Primary Examiner* — Yazan A Soofi
(74) *Attorney, Agent, or Firm* — Erson IP (Nelson IP)

(57) ABSTRACT

A charging rescue system and method for all-electric vehicles comprises: a rescue vehicle APP, a charging rescue vehicle, a rescued vehicle APP, and a rescue platform. The rescue vehicle APP comprises a user module, an order module, a monitoring module, and a communication module. The charging rescue vehicle comprises a controller, a GPS device, a direct current battery charger, an alternating current battery charger, and a measuring module. The rescued vehicle APP comprises a user module, an order module, a payment module, and a communication module. The rescue platform comprises an access module, an order execution module, a vehicle selection module, a rescue vehicle monitoring module, a bill management module, and a user authentication module.

1 Claim, 2 Drawing Sheets

(51) Int. Cl.
    *B60L 53/14*      (2019.01)
    *H02J 7/34*       (2006.01)
    *G06Q 30/06*      (2012.01)
    *B60L 58/10*      (2019.01)
    *B60L 53/66*      (2019.01)
    *G06Q 50/06*      (2012.01)
    *B60L 3/00*       (2019.01)
    *H02J 7/00*       (2006.01)

(52) U.S. Cl.
    CPC ............ *B60L 53/57* (2019.02); *B60L 53/665* (2019.02); *G06Q 30/06* (2013.01); *G06Q 30/0601* (2013.01); *G06Q 30/0635* (2013.01); *G06Q 50/06* (2013.01); *H02J 7/00* (2013.01); *H02J 7/342* (2020.01); *B60L 2240/622* (2013.01); *B60L 2240/80* (2013.01); *H02J 7/00034* (2020.01)

(58) Field of Classification Search
    USPC .......................................................... 701/22
    See application file for complete search history.

(56) References Cited

FOREIGN PATENT DOCUMENTS

| CN | 204077388 U   | 1/2015  |
|----|---------------|---------|
| CN | 104850949 A   | 8/2015  |
| CN | 104915771 A   | 9/2015  |
| CN | 105034842 A   | 11/2015 |
| CN | 105406536 A   | 3/2016  |
| KR | 20130046692 A | 5/2013  |

* cited by examiner

US 10,744,896 B2

CHARGING RESCUE SYSTEM AND METHOD FOR ALL-ELECTRIC VEHICLES

CROSS-REFERENCE TO RELATED APPLICATIONS

This application is a continuation of International Patent Application No. PCT/CN2015/099139 with a filing date of Dec. 28, 2015, designating the United States, now pending, and further claims priority to Chinese Patent Application No. 201510886976.8 with a filing date of Dec. 7, 2015. The content of the aforementioned applications, including any intervening amendments thereto, are incorporated herein by reference.

TECHNICAL FIELD

The present invention belongs to the technical field of traffic transportation, and particularly to a charging rescue system and method for all-electric vehicles.

BACKGROUND OF THE PRESENT INVENTION

With continuous popularization of new-energy all-electric vehicles, more and more all-electric vehicles would be driven on the road. However, a long charging time and a short driving mileage are inevitable defects of the all-electric vehicles. The most embarrassing situation for the all-electric vehicles is battery depletion when driving halfway and failing to find a charging pile.

Therefore, many mobile charging vehicles for rescue are launched on the market, but when a rescued vehicle driver applies for rescue by a phone or a network, it is hard for a rescue vehicle to rapidly find the rescued vehicle due to unclear description for a current geographic position or road by a user.

Moreover, the rescued vehicle often could only wait for the rescue vehicle passively after being applied for rescue. Therefore, the user experience is very poor. Moreover, the half-compulsory service of the rescue causes the defects of long service process, poor service attitude, non-transparent service expense, etc. Sometimes, the rescue becomes an unsatisfied service, and the user becomes a victim.

SUMMARY OF PRESENT INVENTION

The technical problem to be solved by the present invention is to: solve the above-mentioned problems existing in an existing art, so as to provide a charging rescue system and method for all-electric vehicles to complete a one-key rescue function, make the rescue faster, improve the accuracy and efficiency of rescue vehicle dispatching, avoid compulsory consumption and unsatisfied services, make the rescue service more transparent and time-sensitive, and improve the user experience and service quality.

The present invention adopts the technical solution as follows:

A charging rescue system for all-electric vehicles comprises: a rescue vehicle APP, a charging rescue vehicle, a rescued vehicle APP, and a rescue platform, wherein the rescue vehicle APP comprises a user module, an order module, a monitoring module, and a communication module; the charging rescue vehicle comprises a controller, a GPS device, a direct current battery charger, an alternating current battery charger, and a measuring module; the rescued vehicle APP comprises a user module, an order module, a payment module, and a communication module; and the rescue platform comprises an access module, an order execution module, a vehicle selection module, a rescue vehicle monitoring module, a bill management module, and a user authentication module. A serial port of the controller in the charging rescue vehicle is connected to the direct current battery charger, the alternating current battery charger and the measuring module simultaneously, the other serial port of the controller is connected to the GPS device, and a third serial port of the controller is connected to the monitoring module of the rescue vehicle APP; the user module, the order module and the monitoring module of the rescue vehicle APP are connected to the communication module simultaneously; the user module, the order module and the payment module of the rescued vehicle APP are connected to the communication module simultaneously; and the communication modules of the rescue vehicle APP and the rescued vehicle APP are connected to the access module of the rescue platform through Intelnet, and the access module of the rescue platform is connected to the order execution module, the vehicle selection module, the bill management module, the rescue vehicle monitoring module and the user authentication module.

A charging rescue method for all-electric vehicles comprises:

1). An electric vehicle driver selects a one-key rescue function on a rescued vehicle APP;

2). The rescued vehicle APP packages user information and GPS information and sends a rescue application;

3). A rescue platform acquires the rescue application, parses the user information and the GPS information, and generates an order table;

4). A vehicle selection module of the rescue platform calculates a priority using an optimal algorithm according to the GPS information of the current charging rescue vehicle;

5). The rescue platform pushes a charging rescue vehicle list to operating personnel according to a descending order of the priority;

6). The operating personnel select a charging rescue vehicle having the highest priority and assign a rescue order;

7). The rescue platform estimates an rescue expense and time according to the GPS information of the charging rescue vehicle that accepts the order;

8). The charging rescue vehicle acquires the order, and accepts the order;

9). The rescue platform pushes the estimated expense and time and a charging rescue vehicle state to the rescued vehicle APP;

10). The electric vehicle driver selects whether to accept the rescue order;

11). An order execution module of the rescue platform informs a rescue vehicle APP when the rescue is accepted, and a rescue action is started;

12). In a rescue process, a rescue vehicle monitoring module of the rescue platform acquires the GPS of the charging rescue vehicle in real time, and pushes the GPS to the rescued vehicle APP, so that the electric vehicle driver could know a position, a speed and an expected arrival time of the charging rescue vehicle in real time;

13). When the charging rescue vehicle is arrived, the electric vehicle driver selects a charging mode, and the rescue vehicle charges the rescued vehicle;

14). In a charging process, the charging rescue vehicle sends data of a battery charger and a measuring module to the rescue platform in real time;

15). The rescue platform pushes real-time charging data of the charging rescue vehicle to the rescued vehicle APP through the order execution module;

16). A user could see the charging process on the rescued vehicle APP;

17). When charging is completed, order information pushed by the rescue vehicle APP is sent to the rescued vehicle APP via the rescue platform;

18). The rescued vehicle APP informs the user of payment and evaluation;

19). The rescued vehicle APP sends payment and evaluation information to the rescue platform;

20). The rescue platform finishes the rescue and presses the rescue order into a bill management module.

The charging rescue method for the all-electric vehicles is specifically as follows:

1) Firstly, the rescued vehicle APP is installed on a mobile phone of the electric vehicle driver; a user module in the rescued vehicle APP is connected to the access module of the rescue platform through a communication module and Intelnet; the user information is registered in a user authentication module of the rescue platform; and relevant information of the all-electric vehicles is bound;

2) When the all-electric vehicles break down due to power shortage, the driver runs the rescued vehicle APP on the mobile phone; the rescued vehicle APP automatically starts the user module; the user module is connected to the access module of the rescue platform with a 3G/4G network through the communication module and Intelnet; and the driver enters a main page of the rescued vehicle APP after passing the authentication of the rescue platform and the user authentication module; at this time, the driver uses the one-key rescue function, and the order module is immediately started to send rescue application information, user data and current GPS position data of the user to the rescue platform through the communication module and Intelnet, and the access module of the rescue platform acquires the data and immediately pushes such data to the order execution module;

3) A complete order form is generated in the order execution module, and meanwhile, the acquired user information is matched with vehicle data in a database by virtue of the order form; and the vehicle data and the GPS data are packaged and pushed to the vehicle selection module;

4) The vehicle selection module acquires a vehicle optimization application from the order execution module, then acquires related GPS data, idle state data and vehicle type matching data from the monitoring module of the rescue vehicle APP according to the GPS information of the rescued data and the vehicle data, and synthesizes the data; and each rescue vehicle is subjected to optimizing degree grading according to an optimal strategy algorithm, and the data is pushed to the order execution module according to a descending order of grades;

5) The operating personnel of the rescue platform select the most suitable vehicle according to the optimizing degree grades, and allocate the order to the rescue vehicle;

6) The rescue vehicle APP is installed on a display terminal of the rescue vehicle, and when the rescue vehicle works, the display terminal is started, and the rescue vehicle APP is connected to the rescue platform through the communication module and Intelnet, and is authenticated by the user authentication module on the rescue platform; a monitoring module is provided in the rescue vehicle APP, and is in communication with a controller of the charging rescue vehicle through Bluetooth, the serial port, WIFI or Ethernet, and the controller of the charging rescue vehicle is connected to the direct current battery charger, the alternating current battery charger, the measuring module and the GPS device through the serial port; the monitoring module of the rescue vehicle APP acquires related data on a current, a voltage and a temperature of the direct current battery charger and the alternating current battery charger from the controller of the charging rescue vehicle; related data on electric quantity and a charging time of the measuring module and the GPS position data of the charging rescue vehicle are packaged and sent to the access module of the rescue platform through the communication module and Intelnet, and the access module sends the data to the monitoring module of the rescue vehicle APP; and the monitoring module of the rescue vehicle APP monitors a position of each rescue vehicle, an alternating current, states of the direct current and alternating current battery chargers and measuring module data;

7) When the order data is sent to the rescue vehicle APP by the order execution module of the rescue platform through the communication module and internet, the order module in the rescue vehicle APP acquires order information and displays the order information to the rescue vehicle driver, and a rescue vehicle worker selects to accept or refuse according to his situation; the rescue platform reselects the rescue vehicle in case of selecting to refuse; the rescue platform calculates a distance and an expected rescue expense according to GPS of both the rescue vehicle and the rescued vehicle in case of selecting to accept; the rescue platform sends the expected expense, an expected arrival time and the relevant information of the charging rescue vehicle to the rescued vehicle APP; the rescued vehicle APP receives the information; the all-electric vehicle driver reviews whether to accept an order content; the order takes effect when the all-electric vehicle driver selects to accept the order; the order execution module of the rescue platform tracks an order execution process; and the order execution module acquires rescue vehicle data in the monitoring module of the rescue vehicle APP and shares the rescue vehicle data to the order module of the rescued vehicle APP through the communication module and Intelnet; and the all-electric vehicle driver may inquire a position, a speed and an expected arrival time state of the rescued vehicle in the order module in real time;

8) The charging rescue vehicle arrives at the position of the rescued vehicle; the user selects a charging mode and the rescued vehicle is charged by the charging rescue vehicle; the monitoring module in the rescue vehicle APP acquires data of the rescue vehicle measuring module, the alternating current battery charger and the direct current battery charger in real time; the data is packaged and sent to the rescue vehicle monitoring module of the rescue platform through the communication module and Intelnet, and shared through the order execution module and the order module of the rescued vehicle APP; and the all-electric vehicle driver sees a real-time charging situation of the charging rescue vehicle from the order module;

9) When charging is completed, the rescued vehicle APP packages the related data of the charging and sends such data to the rescue vehicle monitoring module of the rescue platform through the communication module and Intelnet; the rescue vehicle monitoring module transfers the data to the order execution module; the order execution module generates a bill and pushes the bill to the rescued vehicle APP through the access module; the rescued vehicle APP invokes a payment module to pay by the user; the user evaluates the service after the payment is completed; the rescued vehicle APP sends a payment state and evaluation information to the order execution module of the rescue platform through the communication module and Intelnet after the payment and evaluation are completed; and the order execution module finishes the order, and then presses an order record into a bill management module for storage, so as to facilitate query of the user.

Beneficial Effects

According to the rescue system and method described in the present invention, the rescued vehicle APP could be installed on the mobile phone of the user, and each all-electric vehicle driver installs the rescued vehicle APP without increasing any cost, and completes the one-key rescue function. The rescued vehicle APP could acquire the GPS of the mobile phone and sends the GPS to the rescue vehicle through the rescue platform, and the rescue vehicle finds the rescued vehicle rapidly through navigation, thereby avoiding that it is hard for the rescue vehicle to find the rescued vehicle due to unclear address description when applying for rescue by the phone or the internet, and making the rescue faster.

The vehicle selection module of the rescue vehicle involved in the rescue system and method of the present invention could calculate the priority for each usable rescue vehicle according to the rescue vehicle state, the positions of both the rescue vehicle and the rescued vehicle and a rescued vehicle model, so as to guide a platform operator on duty to dispatch the rescue vehicle, thereby greatly simplifying the rescue vehicle dispatching process, and improving the accuracy and efficiency of the rescue vehicle dispatching.

In the rescue system and method of the present invention, once the rescue vehicle is successfully dispatched, the rescue distance, the rescue time and the rescue expense would be automatically estimated by the rescue platform, and are confirmed by the user, and the user could select or refuse the rescue according to the practical situation, so that the user consumes clearly, thereby avoiding the occurrence of an outrageous price and the unsatisfied services by means of the specificity of the rescue.

In the rescue system and method of the present invention, the rescue vehicle would send the GPS position information and the charging measuring state information to the rescue platform in the rescue process and the charging process; the rescue platform and the user share such information; and the user could evaluate the rescue service process after the rescue is completed. In this way, the whole rescue process is transparent, and the user could supervise and grasp the rescue process constantly, thereby making the rescue transparent, making the rescue service time-sensitive; and moreover, the rescue service could be graded, thereby improving the service experience continuously.

In the rescue system and method of the present invention, the order is managed by the special bill management module after being completed, and the user could inquire the service process and the service bill in real time.

DETAILED DESCRIPTION OF PREFERRED EMBODIMENTS

Figure 1:
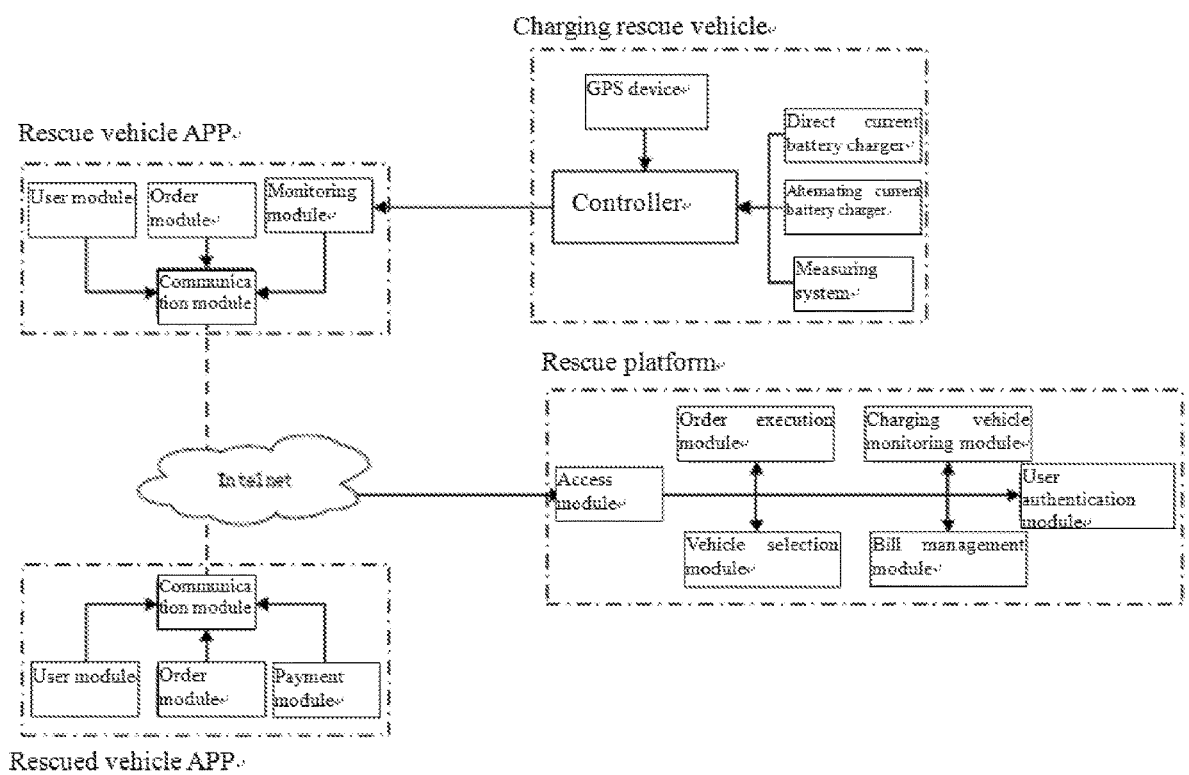
FIG. 1 is a functional block diagram of a system of the present invention.
Figure 2:
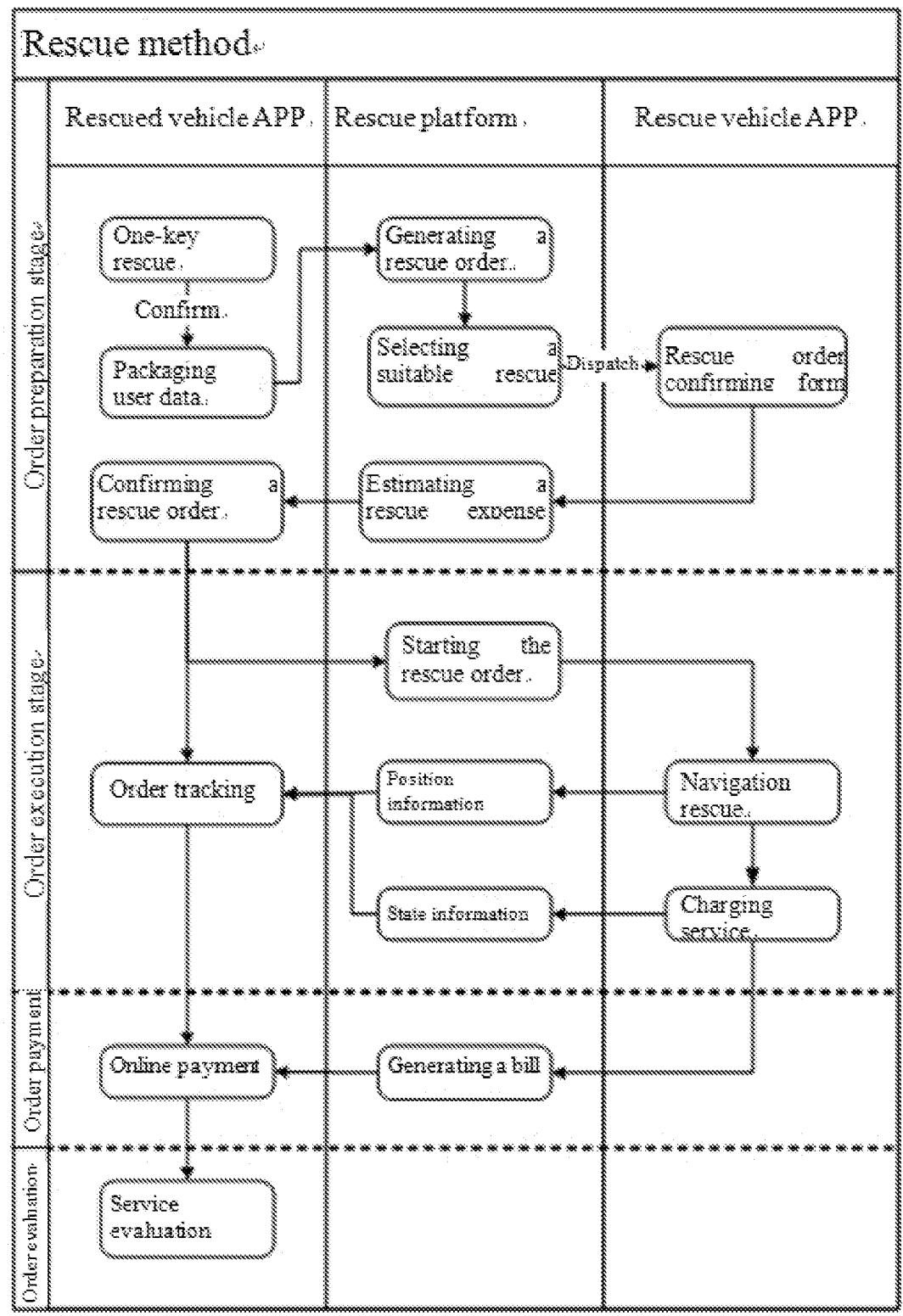
FIG. 2 is a flow chart of a method of the present invention.

Referring to FIG. 1 and FIG. 2, a charging rescue system for all-electric vehicles of the present invention comprises: a rescue vehicle APP, a charging rescue vehicle, a rescued vehicle APP, and a rescue platform, wherein the rescue vehicle APP comprises a user module, an order module, a monitoring module, and a communication module; the charging rescue vehicle comprises a controller, a GPS device, a direct current battery charger, an alternating current battery charger, and a measuring module; the rescued vehicle APP comprises a user module, an order module, a payment module, and a communication module; and the rescue platform comprises an access module, an order execution module, a vehicle selection module, a rescue vehicle monitoring module, a bill management module, and a user authentication module. A serial port of the controller in the charging rescue vehicle is connected to the direct current battery charger, the alternating current battery charger and the measuring module simultaneously, the other serial port of the controller is connected to the GPS device, and a third serial port of the controller is connected to the monitoring module of the rescue vehicle APP; the user module, the order module and the monitoring module of the rescue vehicle APP are connected to the communication module simultaneously; the user module, the order module and the payment module of the rescued vehicle APP are connected to the communication module simultaneously; and the communication modules of both rescue vehicle APP and the rescued vehicle APP are connected to the access module of the rescue platform through Intelnet, and the access module of the rescue platform is connected to the order execution module, the vehicle selection module, the bill management module, the rescue vehicle monitoring module and the user authentication module.

A charging rescue method for all-electric vehicles comprises:

1). An electric vehicle driver selects a one-key rescue function on a rescued vehicle APP;

2). The rescued vehicle APP packages user information and GPS information and sends a rescue application;

3). A rescue platform acquires the rescue application, parses the user information and the GPS information, and generates an order table;

4). A vehicle selection module of the rescue platform calculates a priority using an optimal algorithm according to the GPS information of the current charging rescue vehicle;

5). The rescue platform pushes a charging rescue vehicle list to operating personnel according to a descending order of the priority;

6). The operating personnel select a charging rescue vehicle having the highest priority and assign a rescue order;

7). The rescue platform estimates an rescue expense and time according to the GPS information of the charging rescue vehicle accepting the order;

8). The charging rescue vehicle acquires the order, and accepts the order;

9). The rescue platform pushes the estimated expense and time and a charging rescue vehicle state to the rescued vehicle APP;

10). The electric vehicle driver selects whether to accept the rescue order;

11). The rescue platform and an order execution module inform a rescue vehicle APP when selecting to accept the rescue, and a rescue action is started;

12). In a rescue process, a rescue vehicle monitoring module of the rescue platform acquires the GPS of the charging rescue vehicle in real time, and pushes the GPS to the rescued vehicle APP, so that the electric vehicle driver could know a position, a speed and an expected arrival time of the charging rescue vehicle in real time;

13). When the charging rescue vehicle arrives, the electric vehicle driver selects a charging mode, and the rescue vehicle charges the rescued vehicle;

14). In a charging process, the charging rescue vehicle sends data of a battery charger and a measuring module to the rescue platform in real time;

15). The rescue platform pushes real-time charging data of the charging rescue vehicle to the rescued vehicle APP through an order execution module;

16). A user could see the charging process on the rescued vehicle APP;

17). When charging is completed, order information pushed by the rescue vehicle APP is sent to the rescued vehicle APP via the rescue platform;

18). The rescued vehicle APP informs the user of payment and evaluation;

19). The rescued vehicle APP sends payment and evaluation information to the rescue platform;

20). The rescue platform finishes the rescue and presses the rescue order into a bill management module.

The charging rescue method for the all-electric vehicles is specifically as follows:

1) Firstly, the rescued vehicle APP is installed on a mobile phone of the electric vehicle driver; a user module in the rescued vehicle APP is connected to the access module of the rescue platform through a communication module and Intelnet; the user information is registered in a user authentication module of the rescue platform; and relevant information of the all-electric vehicles is bound;

2) When the all-electric vehicles break down due to power shortage, the driver runs the rescued vehicle APP on the mobile phone; the rescued vehicle APP automatically starts the user module; the user module is connected to the access module of the rescue platform with a 3G/4G network through the communication module and Intelnet; and the driver enters a main page of the rescued vehicle APP after passing the authentication of the rescue platform and the user authentication module; at this time, the driver users the one-key rescue function, and the order module is immediately started to send rescue application information, user data and current GPS position data of the user to the rescue platform through the communication module and Intelnet; and the access module of the rescue platform acquires the partial data and immediately pushes such data to the order execution module;

3) A complete order form is generated in the order execution module, and meanwhile, the acquired user information is matched with vehicle data in a database by virtue of the order form; and the vehicle data and the GPS data are packaged and pushed to the vehicle selection module;

4) The vehicle selection module acquires a vehicle optimization application from the order execution module, then acquires related GPS data, idle state data and vehicle type matching data from the monitoring module of the rescue vehicle APP according to the GPS information of the rescued data and the vehicle data, and synthesizes the data; and each rescue vehicle is subjected to optimizing degree grading according to an optimal strategy algorithm, and the data is pushed to the order execution module according to a descending order of grades;

5) The operating personnel of the rescue platform select the most suitable vehicle according to the optimizing degree grading, and allocate the order to the rescue vehicle;

6) The rescue vehicle APP is installed on a display terminal of the rescue vehicle, and when the rescue vehicle works, the display terminal is started, and the rescue vehicle APP is connected to the rescue platform through the communication module and Intelnet, and is authenticated by the user authentication module on the rescue platform; a monitoring module is provided in the rescue vehicle APP, and is in communication with a controller of the charging rescue vehicle through Bluetooth, the serial port, WIFI or Ethernet; and the controller of the charging rescue vehicle is connected to the direct current battery charger, the alternating current battery charger, the measuring module and the GPS device through the serial port; the monitoring module of the rescue vehicle APP acquires related data on a current, a voltage and a temperature of the direct current battery charger and the alternating current battery charger from the controller of the charging rescue vehicle; related data on electric quantity and a charging time of the measuring module and the GPS position data of the charging rescue vehicle are packaged and sent to the access module of the rescue platform through the communication module and Intelnet; the access module sends the data to the monitoring module of the rescue vehicle APP; and the monitoring module of the rescue vehicle APP monitors a position of each rescue vehicle, an alternating current, states of the direct current and alternating current battery chargers and measuring module data;

7) When the order data is sent to the rescue vehicle APP by the order execution module of the rescue platform through the communication module and internet, the order module in the rescue vehicle APP acquires order information and displays the order information to the rescue vehicle driver, and a rescue vehicle worker selects to accept or refuse according to his situation; the rescue platform reselects the rescue vehicle in case of selecting to refuse; the rescue platform calculates a distance and an expected rescue expense according to GPS of both the rescue vehicle and the rescued vehicle in case of selecting to accept; the rescue platform sends the expected expense, an expected arrival time and the relevant information of the charging rescue vehicle to the rescued vehicle APP; the rescued vehicle APP receives the information; the all-electric vehicle driver reviews whether to accept an order content; the order takes effect when the all-electric vehicle driver selects to accept the order; the order execution module of the rescue platform tracks an order execution process; and the order execution module acquires rescue vehicle data in the monitoring module of the rescue vehicle APP and shares the rescue vehicle data to the order module of the rescued vehicle APP through the communication module and Intelnet; and the all-electric vehicle driver could inquires a position, a speed and an expected arrival time state of the rescued vehicle in the order module in real time;

8) The charging rescue vehicle arrives at the position of the rescued vehicle; the user selects a charging mode and the rescued vehicle is charged by the charging rescue vehicle; the monitoring module in the rescue vehicle APP acquires data of the rescue vehicle measuring module, the alternating current battery charger and the direct current battery charger in real time; the data is packaged and sent to the rescue vehicle monitoring module of the rescue platform through the communication module and Intelnet, and shared through the order execution module and the order module of the rescued vehicle APP; and the all-electric vehicle driver sees a real-time charging situation of the charging rescue vehicle from the order module;

9) When charging is completed, the rescued vehicle APP packages the related data of the charging and sends such data to the rescue vehicle monitoring module of the rescue platform through the communication module and Intelnet; the rescue vehicle monitoring module transfers the data to the order execution module; the order execution module generates a bill and pushes the bill to the rescued vehicle APP through the access module; the rescued vehicle APP calls a payment module to pay by the user; the user evaluates the service after the payment is completed; the rescued vehicle APP sends a payment state and evaluation information to the order execution module of the rescue platform through the communication module and Intelnet after the payment and evaluation are completed; and the order execution module finishes the order, and then presses an order record into a bill management module for storage, so as to facilitate query of the user.

We claim:

1. A charging rescue system for all-electric vehicles, comprising: a rescue vehicle APP, a charging rescue vehicle, a rescued vehicle APP, and a rescue platform, wherein the rescue vehicle APP comprises a user module, an order module, a monitoring module, and a communication module; the charging rescue vehicle comprises a controller, a GPS device, a direct current battery charger, an alternating current battery charger, and a measuring module; the rescued vehicle APP comprises a user module, an order module, a payment module, and a communication module; and the rescue platform comprises an access module, an order execution module, a vehicle selection module, a rescue vehicle monitoring module, a bill management module, and a user authentication module; a serial port of the controller in the charging rescue vehicle is connected to the direct current battery charger, the alternating current battery charger and the measuring module simultaneously, the other serial port of the controller is connected to the GPS device, and a third serial port of the controller is connected to the monitoring module of the rescue vehicle APP; the user module, the order module and the monitoring module of the rescue vehicle APP are connected to the communication module simultaneously; the user module, the order module and the payment module of the rescued vehicle APP are connected to the communication module simultaneously; and the communication modules of the rescue vehicle APP and the rescued vehicle APP are connected to the access module of the rescue platform through Internet, and the access module of the rescue platform is connected to the order execution module, the vehicle selection module, the bill management module, the rescue vehicle monitoring module and the user authentication module.

* * * * *